US012753292B2

(12) United States Patent
Kim et al.

(10) Patent No.: US 12,753,292 B2
(45) Date of Patent: *Oct. 6, 2026

(54) CITRATE-BASED PLASTICIZER COMPOSITION AND RESIN COMPOSITION COMPRISING THE SAME

(71) Applicant: LG CHEM, LTD., Seoul (KR)

(72) Inventors: Hyun Kyu Kim, Daejeon (KR); Seok Ho Jeong, Daejeon (KR); Jeong Ju Moon, Daejeon (KR); Woo Hyuk Choi, Daejeon (KR); Yun Ki Cho, Daejeon (KR); Joo Ho Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 756 days.

This patent is subject to a terminal disclaimer.

(21) Appl. No.: 17/606,403

(22) PCT Filed: Jul. 29, 2020

(86) PCT No.: PCT/KR2020/010004
§ 371 (c)(1),
(2) Date: Oct. 25, 2021

(87) PCT Pub. No.: WO2021/020878
PCT Pub. Date: Feb. 4, 2021

(65) Prior Publication Data

US 2022/0195143 A1 Jun. 23, 2022

(30) Foreign Application Priority Data

Jul. 30, 2019 (KR) ........................ 10-2019-0092609

(51) Int. Cl.
*C08K 5/11* (2006.01)
*C08K 5/00* (2006.01)

(52) U.S. Cl.
CPC .............. *C08K 5/11* (2013.01); *C08K 5/0016* (2013.01); *C08L 2201/08* (2013.01)

(58) Field of Classification Search
CPC ..... C08K 5/11; C08K 5/0016; C08L 2201/08; C08L 101/00
See application file for complete search history.

(56) References Cited

U.S. PATENT DOCUMENTS

| | | | |
|---|---|---|---|
| 4,883,905 | A | 11/1989 | Hull et al. |
| 2002/0198402 | A1 | 12/2002 | Bohnen et al. |
| 2007/0287781 | A1 | 12/2007 | Grass et al. |
| 2011/0046283 | A1 | 2/2011 | Grass et al. |
| 2012/0270978 | A1 | 10/2012 | Myers et al. |
| 2017/0081501 | A1 | 3/2017 | Kim et al. |
| 2019/0211183 | A1 | 7/2019 | Kim et al. |
| 2021/0070964 | A1 | 3/2021 | Kim et al. |
| 2022/0177672 | A1 | 6/2022 | Kim et al. |
| 2022/0251336 | A1 | 8/2022 | Kim et al. |

FOREIGN PATENT DOCUMENTS

| | | | | | |
|---|---|---|---|---|---|
| CN | 103113617 | A | | 5/2013 | |
| DE | 10 2007 001 540 | A1 | | 8/2007 | |
| DE | 10 2008 002 168 | A1 | | 12/2009 | |
| EP | 1 256 566 | A2 | | 11/2002 | |
| EP | 2810932 | A | | 12/2014 | |
| EP | 3 130 631 | A1 | | 2/2017 | |
| EP | 3 255 086 | A1 | | 12/2017 | |
| EP | 3 476 890 | A1 | | 5/2019 | |
| JP | S61-001643 | A | | 1/1986 | |
| JP | S61-051044 | A | | 3/1986 | |
| JP | 2007-326859 | A | | 12/2007 | |
| JP | 2013-515822 | A | | 5/2013 | |
| JP | 2018-502981 | A | | 2/2018 | |
| JP | 2022-524788 | A | | 5/2022 | |
| KR | 10-2002-0085812 | A | | 11/2002 | |
| KR | 10-2009-0087733 | A | | 8/2009 | |
| KR | 10-2016-0095875 | A | | 8/2016 | |
| KR | 10-2017-0020282 | A | | 2/2017 | |
| KR | 201720282 | A | * | 2/2017 | ............ C07C 67/02 |
| KR | 10-2018-0039305 | A | | 4/2018 | |
| KR | 10-2018-0092888 | A | | 8/2018 | |
| KR | 10-1952338 | B1 | | 2/2019 | |

OTHER PUBLICATIONS

English Translation of KR-201720282-A (Year: 2017).*
PubChem (1-Hexanol—Open Chemistry Database entry) (Year: 2018).*
Jong Seok Son et al., "Citric acid ester plasticizer for polyvinyl chloride floor covering", Database CA [Online], Chemical Abstracts Service, Columbus, Ohio, US, Apr. 24, 2018, XP002807165, retrieved from STN Database accession No. 2018:806377.
Se In Yang et al., "Citric ester based plasticizer compositions for polyvinyl chloride resins with good heat resistance, transparency, adhesion, elongation, and tensile strength", Database CA [Online], Chemical Abstracts Service, Columbus, Ohio, US, Aug. 24, 2009, XP002807166, retrieved from STN Database accession No. 2009:1022737.

* cited by examiner

*Primary Examiner* — Mark Eashoo
*Assistant Examiner* — Cullen L G Davidson
(74) *Attorney, Agent, or Firm* — Bryan Cave Leighton Paisner LLP

(57) ABSTRACT

A citrate-based plasticizer composition including a citrate-based composition, and a citrate-based composition including one or more citrates. The citrates are characterized in having an alkyl group derived from an isomer mixture of hexyl alcohol having a degree of branching of 2.0 or less. Stress resistance and mechanical properties can be maintained at values equal or better than conventional plasticizers, the balance between migration and volatile properties and plasticization efficiency can be maintained, and light resistance and heat resistance can be markedly improved by applying the citrate-based plasticizer composition to a resin.

6 Claims, No Drawings

CITRATE-BASED PLASTICIZER COMPOSITION AND RESIN COMPOSITION COMPRISING THE SAME

CROSS-REFERENCE TO RELATED APPLICATIONS

This application is a U.S. national stage of international Application No. PCT/KR2020/010004 filed on Jul. 29, 2020, and claims the benefit of priority based on Korean Patent Application No. 10-2019-0092609, filed on Jul. 30, 2019, the entire contents of which are incorporated herein by reference.

TECHNICAL FIELD

The present invention relates to a citrate-based plasticizer composition including citrates in which the carbon numbers of the alkyl radicals of the citrate are the same, and a resin composition including the same.

BACKGROUND

Generally, plasticizers are obtained through the reaction of alcohols with polycarboxylic acids, such as phthalic acid and adipic acid, to form corresponding esters. In addition, considering the internal and external regulations because of the harmful effects of phthalate-based plasticizers on the human body, studies are being continued on plasticizer compositions which can replace phthalate-based plasticizers, such as terephthalate-based, adipate-based and other polymer-based plasticizers.

Meanwhile, regardless of the type of industry, including plastisol-type of industry, which includes flooring materials, wallpaper, soft and hard sheets, etc., calendaring-type of industry, extrusion/injection compound-type of industry, the demand for eco-friendly products is increasing. To reinforce quality, processability and productivity of the finished products, an appropriate plasticizer is required considering discoloration, migration, mechanical properties, etc.

According to the properties required by the various industry types, such as tensile strength, elongation rate, light resistance, migration, gelling properties and absorption rate, supplementary materials such as a plasticizer, a filler, a stabilizer, a viscosity decreasing agent, a dispersant, a defoaming agent and a foaming agent are mixed with a PVC resin.

For example, for di(2-ethylhexyl) terephthalate (DEHTP), which is relatively cheap and widely included in plasticizer compositions which can be applied to PVC, hardness or sol viscosity is high, absorption rate of the plasticizer is relatively slow, and migration and stress migration are not good.

To improve the above-discussed properties, a transesterification production of butanol may be added as a plasticizer to a composition comprising DEHTP. In this case, plasticization efficiency is improved but volatile loss or thermal stability is inferior and mechanical properties are somewhat degraded, and improvement of physical properties is required. Accordingly, there is no generally known solution other than compensating for such defects by including a second plasticizer.

However, when a second plasticizer is included, other, unexpected drawbacks are generated as follows: the change in physical properties is hard to predict, the inclusion of a second plasticizer can increase the unit cost of the product, the improvement of the physical properties is not clearly shown except in certain cases, and problems relating to compatibility with a resin can arise.

In addition, if a material like tri(2-ethylhexyl) trimellitate or triisononyl trimellitate is applied as a trimellitate-based product to improve the inferior migration and loss properties of the DEHTP products, migration or loss properties can be improved, but plasticization efficiency can be degraded, and a great deal of material is required to be injected to provide a resin with suitable plasticization effect, and considering the relatively high unit price of the products, commercialization thereof is impossible.

Accordingly, development of products that solve the environmental issues of conventional phthalate-based products or products that improve inferior physical properties of eco-friendly products to address the environmental issues of the phthalate-based products is required.

SUMMARY

An objective of the present invention is to provide a plasticizer composition, which includes citrates having isomeric radicals having the same number of carbon atoms, and a plasticizer composition having mechanical properties and stress resistance equal to or better than the corresponding properties of conventional plasticizers and at the same time, markedly improving light resistance while having suitable balance between migration properties and loss properties with plasticizer efficiency.

To address these drawbacks, according to an exemplary embodiment of the present invention, there is provided a citrate-based plasticizer composition including a citrate-based composition including one or more citrates of Formula 1 below, wherein an alkyl group of the citrate is derived from an isomer mixture of hexyl alcohol having a degree of branching of 2.0 or less:

[Formula 1]

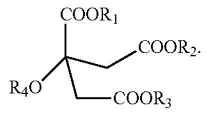

In Formula 1, $R_1$ to $R_3$ are each independently an n-hexyl group, a branched hexyl group or a cyclopentylmethyl group, and $R_4$ is hydrogen or an acetyl group.

According to another exemplary embodiment of the present invention, there is provided a resin composition including 100 parts by weight of a resin, and 5 to 150 parts by weight of the plasticizer composition.

The resin can be one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, natural rubber and synthetic rubber.

The plasticizer composition according to an exemplary embodiment of the present invention, if used in a resin composition, can maintain and improve mechanical properties and stress resistance to be equal to or better than corresponding properties of a conventional plasticizer, and at the same time, can markedly improve light resistance while achieving a suitable balance between migration properties and loss properties with plasticization efficiency.

DETAILED DESCRIPTION

It will be understood that terms or words used in the present disclosure and claims should not be interpreted as having a meaning that is defined in common or in dictionaries, but should be interpreted consistent with the technical scope of the present invention based on the principle that inventors can appropriately define the concept of the terms to explain the invention at his best method.

Definition of Terms

The term “composition” as used in the present disclosure includes a mixture of materials including the corresponding composition as well as a reaction product and a decomposition product formed from the materials of the corresponding composition.

The term “straight vinyl chloride polymer” as used in the present disclosure can be one type of vinyl chloride polymers and polymerized by suspension polymerization, bulk polymerization, etc., and can refer to a polymer having a porous particle shape in which a large number of pores are dispersed, having a size of tens to hundreds of micrometers, no cohesiveness, and excellent flowability.

The term “paste vinyl chloride polymer” as used in the present disclosure can be one type of vinyl chloride polymers and polymerized by microsuspension polymerization, microseed polymerization, emulsion polymerization, etc., and can refer to a polymer having minute particles without pores and a size of tens to thousands of nanometers, cohesiveness, and inferior flowability.

The terms “comprising”, and “having” and the derivatives thereof in the present invention, though these terms are particularly disclosed or not, do not intended to preclude the presence of optional additional components, steps, or processes. In order to avoid any uncertainty, all compositions claimed by using the term “comprising” can include optional additional additives, auxiliaries, or compounds, including a polymer or any other materials, unless otherwise described to the contrary. In contrast, the term “consisting essentially of ~” excludes unnecessary ones for operation and precludes optional other components, steps or processes from the scope of optional continuous description. The term “consisting of ~” precludes optional components, steps or processes, which are not particularly described or illustrated.

Measurement Methods

In the present disclosure, the content analysis of the components in a composition is conducted by gas chromatography measurement using a gas chromatography equipment of Agilent Co. (product name: Agilent 7890 GC, column: HP-5, carrier gas: helium (flow rate of 2.4 ml/min), detector: F.I.D., injection volume: 1 μl, initial value: 70° C./4.2 min, end value: 280° C./7.8 min, program rate: 15° C./min).

In the present disclosure, “hardness” means Shore hardness (Shore “A” and/or Shore “D”) at 25° C. and is measured in conditions of 3T 10 s using ASTM D2240. The hardness can be an index for evaluating plasticization efficiency, and lower the hardness value, the better the plasticization efficiency.

In the present disclosure, “tensile strength” is measured according to an ASTM D638 method by drawing a specimen in a cross head speed of 200 mm/min (1T) using a test apparatus of U.T.M (manufacturer: Instron, model name: 4466), measuring a point where the specimen is cut, and calculating the tensile strength according to the following Mathematical Formula 1:

$$\text{Tensile strength } (\text{kgf/cm}^2) = \text{load value (kgf)/thickness (cm)} \times \text{width (cm)}. \quad \text{[Mathematical Formula 1]}$$

In the present disclosure, “elongation rate” is measured according to an ASTM D638 method by drawing a specimen in a cross head speed of 200 mm/min (1T) using the U.T.M, measuring a point where the specimen is cut, and calculating the elongation rate according to the following Mathematical Formula 2:

$$\text{Elongation rate } (\%) = \text{length after elongation/initial length} \times 100. \quad \text{[Mathematical Formula 2]}$$

In the present disclosure, “migration loss” is measured according to KSM-3156, by which a specimen with a thickness of 2 mm or more is obtained, glass plates are attached onto both sides of the specimen and a load of 1 kgf/cm$^2$ is applied. The specimen is placed in a hot air circulation type oven (80° C.) for 72 hours, then taken out and cooled at room temperature for 4 hours. Then, the glass plates attached to both sides of the specimen are removed, the weights before and after placing a glass plate and a specimen plate in the oven are measured, and the migration loss is calculated according to Mathematical Formula 3:

$$\text{Migration loss } (\%) = \{[(\text{weight of initial specimen}) - (\text{weight of specimen after standing in oven})] / (\text{weight of initial specimen})\} \times 100. \quad \text{[Mathematical Formula 3]}$$

In the present disclosure, “volatile loss” is calculated by processing a specimen at 80° C. for 72 hours and then, measuring the weight of the specimen, and calculating the volatile loss according to Mathematical Formula 4:

$$\text{Volatile loss } (wt\ \%) = \{[(\text{weight of initial specimen}) - (\text{weight of specimen after processing})] / (\text{weight of initial specimen})\} \times 100. \quad \text{[Mathematical Formula 4]}$$

Various conditions, such as the temperature, the speed of revolution, the time, etc., can be somewhat changed according to situations, and a measurement method and its corresponding conditions are required to be separately indicated when the conditions are varied.

Hereinafter, the present invention will be explained in more detail to assist in the understanding of the present invention.

According to an exemplary embodiment of the present invention, a plasticizer composition includes a citrate-based composition including one or more citrates of Formula 1 below, wherein the alkyl group of the citrate is derived from an isomer mixture of hexyl alcohol having a degree of branching of 2.0 or less:

[Formula 1]

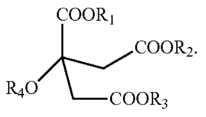

In Formula 1, $R_1$ to $R_3$ are each independently an n-hexyl group, a branched hexyl group or a cyclopentylmethyl group, and $R_4$ is hydrogen or an acetyl group.

According to an exemplary embodiment of the present invention, the isomer mixture of the hexyl alcohol of the plasticizer composition includes two or more selected from the group consisting of 1-hexanol, 1-methylpentanol, 2-methylpentanol, 3-methylpentanol, 4-methylpentanol, 1,1-dimethylbutanol, 1,2-dimethylbutanol, 1,3-dimethylbutanol, 2,2-dimethylbutanol, 2,3-dimethylbutanol, 3,3-dimethylbutanol, 1-ethylbutanol, 2-ethylbutanol, 3-ethylbutanol and cyclopentylmethanol.

The alkyl groups of $R_1$ to $R_3$ of Formula 1 can be determined based on the alcohol included in such a hexyl alcohol isomer, and in a final composition, diverse compositions in which three, two or one of the isomer alkyl groups of hexyl alcohol are bonded to three alkyl groups, can be included, and the ratio of components in the final composition can be determined by the ratio of the alcohols being reacted.

As described above, when an alcohol having 6 carbon atoms is used, an absorption rate of a suitable degree can be achieved, processability can be improved, and tensile strength, elongation rate and volatile loss can be markedly improved when compared with an alcohol having less than 6 carbon atoms, and excellent plasticization efficiency can be attained, and large migration resistance and stress resistance can be expected compared with an alcohol having greater than 6 carbon atoms.

The isomer mixture of hexyl alcohol of the plasticizer composition according to an exemplary embodiment of the present invention has a degree of branching of 2.0 or less, preferably, 1.5 or less. Particularly, the degree of branching can be 1.5 or less, 1.3 or less, more preferably, 1.1 or less. In addition, the degree of branching can be 0.1 or more, 0.2 or more, 0.3 or more, most preferably, 0.7 or more. The degree of branching of the isomer mixture of hexyl alcohol can be maintained even though transformed into a citrate-based plasticizer composition. If the degree of branching is greater than 2.0, balance between physical properties can be broken, one or more evaluation standards of a product can fall short, but in a preferred range of 1.5 or less, the improvement of migration loss and volatile loss as well as mechanical properties can be even further optimized, and an excellent balance between physical properties can be attained.

Here, the degree of branching can mean the number of branched carbons of the alkyl groups combined with a material included in a composition, and can be determined according to the weight ratio of a corresponding material. For example, if an alcohol mixture includes 60 wt % of n-hexyl alcohol, 30 wt % of methylpentyl alcohol, and 10 wt % of ethylbutyl alcohol, the number of branched carbons of each alcohol is 0, 1 and 2, respectively, and the degree of branching can be calculated to be 0.5 as follows: $[(60\times0)+(30\times1)+(10\times2)]/100$. Here, the number of branched carbons of cyclopentylmethanol is regarded as 0.

The plasticizer composition according to an exemplary embodiment of the present invention may include 1-hexanol, 2-methylpentanol and 3-methylpentanol in the isomer mixture of hexyl alcohol. By including 2-methylpentanol and 3-methylpentanol together, a balance between physical properties can be maintained, and excellent effects with regard to volatile loss can be attained.

A branched hexyl alcohol including 2-methylpentanol and 3-methylpentanol may be included in 40 parts by weight or more, 50 parts by weight or more, 60 parts by weight or more, preferably, 65 parts by weight or more, 70 parts by weight or more with respect to 100 parts by weight of the isomer mixture. The branched hexyl alcohol including 2-methylpentanol and 3-methylpentanol may be included in 100 parts by weight or less, 99 parts by weight or less, 98 parts by weight or less, preferably, 95 parts by weight or less, or 90 parts by weight or less. If the branched hexyl alcohol is included in this range, an improvement of mechanical properties can be expected.

In addition, linear 1-hexanol can be included in 50 parts by weight or less, 40 parts by weight or less, preferably, 30 parts by weight or less with respect to 100 parts by weight of the isomer mixture. The 1-hexanol may not be present in components, but may be included in at least 2 parts by weight or more, and in this case, balance between physical properties and improving mechanical properties can be advantageously maintained. Theoretically, linear alcohols are known to exhibit excellent properties, but in the present invention, different results were obtained, and it was confirmed that even better balance between physical properties was obtained using an isomer mixture including a branched alcohol.

The plasticizer composition according to an exemplary embodiment of the present invention can include 1-hexanol, 2-methylpentanol, 3-methylpentanol and cyclopentylmethanol in the isomer mixture of hexyl alcohol. Preferably, by further including cyclopentylmethanol, volatile loss can be further improved while maintaining balance between physical properties.

In this case, the cyclopentylmethanol can be included in 20 parts by weight or less, preferably, 15 parts by weight or less, more preferably, 10 parts by weight or less, or may not be present with respect to 100 parts by weight of the isomer mixture, or at a minimum of 2 parts by weight to obtain effects thereby.

Particularly, depending on the ratio of the branched alkyl groups to the total alkyl radicals present in a final composition, and further, depending on the ratio of a specific branch alkyl radical to the total number of branched alkyl groups, balance between plasticization efficiency and physical properties, such as migration/loss properties, can be controlled, mechanical properties, such as tensile strength and elongation rate, and stress resistance can be maintained at values equal to or better than conventional plasticizer compositions, and remarkable improvement in light resistance can be achieved due to the interaction of four types of cyclohexane triesters included in the composition, and these can be accomplished by the components and the component ratio of the above-described isomers of hexyl alcohol.

Using the method according to exemplary embodiments described herein, products with improved loss properties can be produced while removing environmental issues associated with the use of conventional phthalate-based products, the migration and loss properties of the conventional terephthalate-based products can be markedly improved, and products with significantly improved light resistance when compared with the commercially available conventional products can be produced.

According to an exemplary embodiment of the present invention, as a citrate included in the citrate-based plasticizer composition, $R_4$ of Formula 1 can be hydrogen or an acetyl group. If $R_4$ is hydrogen, generally, excellent plasticization efficiency may be achieved, migration resistance, light resistance, and absorption rate can be maintained at an appropriate level and may be evaluated as having excellent values. However, relatively inferior thermal properties are observed in contrast to the improvement observed for the other physical properties, but this can be addressed by controlling the processing conditions to prevent thermal discoloration during processing.

In another exemplary embodiment, a citrate in which $R_4$ is an acetyl group may be included in the composition. In this case, the thermal properties of the citrate can be improved and thermal resistance can be reinforced, and accordingly, discoloration and carbonization properties can be improved, and advantages relatively free from thermal influence during processing or in complete products can be achieved. Further, by the improvement of thermal properties, excellent volatile loss, tensile strength after exposure to high temperature and the retention ratio of elongation rate (residual rate) can be achieved.

However, due to the increase in molecular weight and steric hindrance effects based on structural changes, a slight deterioration of plasticization efficiency, mechanical properties, migration resistance and absorption rate can arise when an acetyl group is bonded to the citrate.

Accordingly, processing conditions or whether the structural change of $R_4$ is applied, can be suitably selected according to the materials compounded in sheet prescription, compound prescription, etc., the usage applied, the method applied for melt processing, etc., and there are advantages associated with the application of the process described herein in very diverse ranges.

According to an exemplary embodiment of the present invention, when the absorption rate of di(2-ethylhexyl) terephthalate is from 6 minutes and 55 seconds to 7 minutes and 5 seconds, the plasticizer composition can have an absorption rate of 4 minutes and 30 seconds to 6 minutes and 50 seconds, wherein the absorption rate is measured as the time consumed for mixing a resin and an ester compound using a planatary mixer (Brabender, P600) at 77° C. under 60 rpm conditions until the torque of the mixer becomes a stabilized state.

The absorption rate in the above-described range is time for a plasticizer absorbed into a resin, and if the absorption rate is too short, the plasticizer can be emitted again during processing to act as an aggravating factor of migration performance, and a migrated material can volatilize during processing and can possibly deteriorate plasticization efficiency and adversely affect the atmospheric environment. If the absorption rate is too long, a processing time can increase than the conventionally widely used products, for example, di(2-ethylhexyl) terephthalate, and defects of deteriorating productivity can arise.

As a method for preparing the plasticizer composition according to an exemplary embodiment of the present invention, any methods for preparing the above-described plasticizer composition, well-known in the art can be applied without specific limitation.

For example, the composition can be prepared through a direct esterification reaction of citric acid or an anhydride thereof with the isomer mixture of hexyl alcohol, or through a transesterification reaction of trihexyl citrate with the isomer mixture of hexyl alcohol.

The plasticizer composition according to an exemplary embodiment of the present invention is a material prepared by suitably performing the esterification reaction, and the preparation method is not specifically limited only if the above-described conditions are acceptable, particularly, if the ratio of a branched alcohol in the isomer mixture alcohol is controlled, and a specific component is included.

For example, the direct esterification reaction can be performed as follows: a step of injecting citric acid or a derivative thereof and a mixture alcohol of two or more types, adding a catalyst and reacting in a nitrogen atmosphere; a step of removing an unreacted raw material; a step of neutralizing (or deactivating) the unreacted raw material and the catalyst; and a step of removing (for example, using distillation under a reduced pressure) impurities and filtering. Here, when a citrate-based material is combined with an acetyl group, a step of performing acylation reaction can be further included after removing the unreacted raw material.

The components of the isomer mixture of hexyl alcohol and the weight ratio of the components are the same as described above. The isomer mixture of alcohol can be used in a range of 200 to 900 mol %, 200 to 700 mol %, 200 to 600 mol %, 250 to 500 mol %, or 270 to 400 mol % based on 100 mol % of an acid, and by controlling the amount of the alcohol, the component ratio in a final composition can be controlled.

The catalyst can be, for example, one or more selected from an acid catalyst such as sulfuric acid, hydrochloric acid, phosphoric acid, nitric acid, paratoluenesulfonic acid, methanesulfonic acid, ethanesulfonic acid, propanesulfonic acid, butanesulfonic acid, and alkyl sulfate, a metal salt such as aluminum lactate, lithium fluoride, potassium chloride, cesium chloride, calcium chloride, iron chloride, and aluminum phosphate, a metal oxide such as heteropoly acids, natural/synthetic zeolites, cation and anion exchange resins, and an organometal such as tetra alkyl titanate and the polymers thereof. In a particular embodiment, the catalyst can use tetra alkyl titanate. Preferably, as an acid catalyst having low activation temperature, paratoluenesulfonic acid, methanesulfonic acid, etc., may be suitable.

The amount of the catalyst can differ according to the type thereof, and for example, a homogeneous catalyst can be used in an amount of 0.01 to 5 wt %, 0.01 to 3 wt %, 1 to 5 wt % or 2 to 4 wt % based on total 100 wt % of reactants, and a heterogeneous catalyst can be used in an amount of 5 to 200 wt %, 5 to 100 wt %, 20 to 200 wt %, or 20 to 150 wt % based on the total amount of reactants.

In this case, the reaction temperature can be within a range of 100 to 280° C., 100 to 250° C., or 120 to 230° C.

In another exemplary embodiment, the transesterification reaction can be reaction of a citrate, and an alcohol having a different alkyl radical from the alkyl radical of the citrate (a linear alcohol in case of a citrate combined with a branched alkyl group, and a branched alcohol in case of a citrate combined with a linear alkyl group). Here, the alkyl groups of the citrate and the alcohol can be exchanged.

"Transesterification" used in the present invention means the reaction of an alcohol and an ester as shown in Reaction 1 below to interchange R" of the ester with R' of the alcohol:

[Reaction 1]

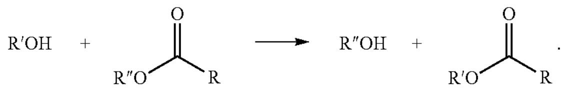

Generally, if the transesterification is carried out and if there are two types of the alkyl groups, four types of ester compositions can be produced as follows: a case where the alkoxide of the alcohol attacks the carbon of three ester groups (RCOOR") which are present in the ester compound; a case where the alkoxide of the alcohol attacks the carbon of two ester groups (RCOOR") which are present in the ester compound; a case where the alkoxide of the alcohol attacks the carbon of one ester group (RCOOR") which is present in the ester compound; and a unreacted case wherein no reaction is performed.

However, in the citrate included in the plasticizer composition according to the present invention, if two ester groups are exchanged or one ester group is exchanged according to the bonding position of an ester group, three types can be formed for each. Accordingly, a maximum of 8 types of compounds can be present in a final composition. However, in the isomer mixture of hexyl alcohol according to the present invention, two types of alkyl groups are present, and the types can be more diverse.

The composition ratio of the mixture prepared through the transesterification can be controlled according to the addition amount of the alcohol. The amount of the alcohol can be 0.1 to 200 parts by weight, particularly, 1 to 150 parts by weight, more particularly, 5 to 100 parts by weight based on 100 parts by weight of the trialkyl citrate. For reference, the determination of the component ratio in a final composition can be the amount of the alcohol added in the direct esterification reaction.

According to an exemplary embodiment of the present invention, the transesterification can be performed at a reaction temperature of 120° C. to 190° C., preferably, 135° C. to 180° C., more preferably, 141° C. to 179° C. for 10 minutes to 10 hours, preferably, 30 minutes to 8 hours, more preferably, 1 to 6 hours. The composition ratio of a final plasticizer composition can be efficiently controlled when the temperature and time are within the above ranges. The reaction time can be calculated to be a temperature achieved after elevating the temperature of the reactants.

The transesterification can be performed in the presence of an acid catalyst or a metal catalyst, and in this case, the reaction time can be decreased.

The acid catalyst can include, for example, sulfuric acid, methanesulfonic acid or p-toluenesulfonic acid, and the metal catalyst can include, for example, an organometal catalyst, a metal oxide catalyst, a metal salt catalyst, or a metal itself.

The metal component can be, for example, any one selected from the group consisting of tin, titanium and zirconium, or a mixture of two or more thereof.

In addition, a step of removing unreacted alcohol and reaction by-products by distillation can be further included after the transesterification reaction. The distillation can be, for example, a two-step distillation by which the alcohol and the by-products are individually separated using the difference in boiling points. In another exemplary embodiment, the distillation can be a mixture distillation, where the unreacted alcohol and the by-products are simultaneously distilled. In this case, a relatively stable ester-based plasticizer composition having a desired composition ratio can be obtained.

According to another exemplary embodiment of the present invention, a resin composition including the plasticizer composition and a resin is provided.

The resin can be one that is well-known in the art. For example, a mixture of one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, natural rubber, synthetic rubber and thermoplastic elastomer can be used, without limitation.

The plasticizer composition can be included in 5 to 150 parts by weight, preferably, 5 to 130 parts by weight, or 10 to 120 parts by weight based on 100 parts by weight of the resin.

Generally, a resin product can be prepared from the resin that includes the plasticizer composition through melt processing or a plastisol processing, and a different resin may be produced by the melt processing and the plastisol processing according to each polymerization method.

For example, solid phase resin particles having a large average particle diameter are prepared by suspension polymerization, or the like, and used in melt processing, and the vinyl chloride polymer is referred to as a straight vinyl chloride polymer. Alternatively, a sol state resin that includes minute resin particles are prepared by emulsion polymerization, or the like, and used in pastisol processing, and this vinyl chloride polymer is referred to as a paste vinyl chloride resin.

In the case of the straight vinyl chloride polymer, a plasticizer can be included in a range of 5 to 80 parts by weight with respect to 100 parts by weight of the polymer, and in the case of the paste vinyl chloride polymer, the plasticizer may be included in a range of 40 to 120 parts by weight with respect to 100 parts by weight of the polymer.

The resin composition can further include a filler. The filler may be included in an amount of 0 to 300 parts by weight, preferably, 50 to 200 parts by weight, more preferably, 100 to 200 parts by weight based on 100 parts by weight of the resin.

The filler can use fillers well-known in the art and is not specifically limited. For example, the filler can be a mixture of one or more kinds selected from silica, magnesium carbonate, calcium carbonate, hard coal, talc, magnesium hydroxide, titanium dioxide, magnesium oxide, calcium hydroxide, aluminum hydroxide, aluminum silicate, magnesium silicate and barium sulfate.

In addition, the resin composition can further include other additives, such as a stabilizer, as necessary. Each of the other additives, such as the stabilizer, may be, for example, in an amount of 0 to 20 parts by weight, preferably, 1 to 15 parts by weight based on 100 parts by weight of the resin.

The stabilizer may be, for example, a calcium-zinc-based (Ca—Zn-based) stabilizer, such as a composite stearate of calcium-zinc or a barium-zinc-based (Ba—Zn-based) stabilizer, but is not specifically limited.

The resin composition can be applied to both melt processing and plastisol processing as described above, and a calendaring processing, an extrusion processing, or an injection processing can be applied to the melt processing, and a coating processing, or the like can be applied to the plastisol processing.

EXAMPLES

Hereinafter, embodiments will be explained in detail to particularly explain the present invention. The present invention can, however, be embodied in different forms and should not be construed as limited to the embodiments set forth herein. Rather, these embodiments are provided so that this disclosure will be thorough and complete, and will fully convey the scope of the inventive concept to those skilled in the art.

Example 1

To a reactor equipped with a stirrer, a condenser and a decanter, 396.4 g of citric acid, 797.2 g of an isomer mixture of hexyl alcohol, and 2 g of tetrabutyl titanate (TnBT) were injected, and under a nitrogen atmosphere, esterification reaction was carried out. After finishing the reaction, a catalyst and the product thus obtained were neutralized with an aqueous alkali solution, and unreacted alcohol and water were separated to finally obtain a plasticizer composition.

Here, the alcohol composition of the isomer mixture of hexyl alcohol is shown in Table 1 below.

Examples 2 to 12

Plasticizer compositions were obtained by the same method as in Example 1 except for changing the alcohol composition of the isomer mixture of hexyl alcohol as in Table 1 below.

TABLE 1

| | 1-hexanol | 2-methyl-pentanol | 3-methyl-pentanol | 2-ethyl-butanol | Cyclo-pentyl methanol |
|---|---|---|---|---|---|
| Example 1 | 30 | 15 | 50 | — | 5 |
| Example 2 | 30 | 30 | 30 | — | 10 |
| Example 3 | 10 | 40 | 40 | — | 10 |
| Example 4 | 20 | 30 | 40 | — | 10 |
| Example 5 | 5 | 30 | 50 | — | 15 |
| Example 6 | 2 | 50 | 40 | — | 8 |
| Example 7 | 8 | 60 | 30 | — | 2 |
| Example 8 | 10 | 40 | 50 | — | — |
| Example 9 | 30 | 30 | 40 | — | — |
| Example 10 | — | 40 | 50 | — | 10 |
| Example 11 | 10 | — | 80 | — | 10 |
| Example 12 | 30 | — | — | 70 | — |

*The amounts of the alcohols are all parts by weights.
*The amounts of the components in the isomer mixture of hexyl alcohol were analyzed by gas chromatography measurement using a gas chromatography equipment of Agilent Co. (product name: Agilent 7890 GC, column: HP-5, carrier gas: helium (flow rate of 2.4 ml/min), detector: F.I.D., injection volume: 1 μl, initial value: 70° C./4.2 min, end value: 280° C./7.8 min, program rate: 15° C./min).

Comparative Example 1

Diisononyl phthalate (DINP), a product of LG Chem, was used as a plasticizer composition.

Comparative Example 2

Di(2-ethylhexyl) terephthalate (DEHTP, LGflex GL300), a product of LG Chem, was used as a plasticizer composition.

Comparative Example 3

A plasticizer composition was obtained by the same method as in Example 1 except for using n-butanol instead of the isomer mixture of hexyl alcohol in Example 1.

Comparative Example 4

A plasticizer composition was obtained by the same method as in Example 1 except for using n-pentanol instead of the isomer mixture of hexyl alcohol in Example 1.

Comparative Example 5

A plasticizer composition was obtained by the same method as in Example 1 except for using 2-methylbutanol instead of the isomer mixture of hexyl alcohol in Example 1.

Comparative Example 6

A plasticizer composition was obtained by the same method as in Example 1 except for using n-heptanol instead of the isomer mixture of hexyl alcohol in Example 1.

Comparative Example 7

A plasticizer composition was obtained by the same method as in Example 1 except for using isoheptanol (2-methylhexanol) instead of the isomer mixture of hexyl alcohol in Example 1.

Comparative Example 8

A plasticizer composition was obtained by the same method as in Example 1 except for using 2-ethylhexanol instead of the isomer mixture of hexyl alcohol in Example 1.

Comparative Example 9

A plasticizer composition was obtained by the same method as in Example 1 except for using isononanol instead of the isomer mixture of hexyl alcohol in Example 1.

Experimental Example 1: Sheet Performance Evaluation

By using the plasticizers of the Examples and the Comparative Examples, specimens were manufactured according to ASTM D638 and the prescription and manufacturing conditions below.

(1) Formulation: 100 parts by weight of a straight vinyl chloride polymer (LS100S), 40 parts by weight of a plasticizer and 3 parts by weight of a stabilizer (BZ-153T)

(2) Mixing: mixing at 98° C. in 700 rpm (3) Manufacture of specimen: 1T and 3T sheets were manufactured by processing at 160° C. for 4 minutes by a roll mill, and at 180° C. for 2.5 minutes (low pressure) and 2 minutes (high pressure) by a press (4) Test Items 1) Hardness: Shore hardness (Shore "A" and "D") at 25° C. was measured using a 3T specimen for 10 seconds using ASTM D2240. The plasticization efficiency was assessed excellent if the value was small.

2) Tensile strength: By an ASTM D638 method, a specimen was drawn in a cross-head speed of 200 mm/min using a test apparatus of U.T.M (manufacturer: Instron, model name: 4466), and a point where the 1T specimen was cut was measured. The tensile strength was calculated as follows.

$$\text{Tensile strength (kgf/cm}^2\text{)} = \text{load value (kgf)/thickness (cm)} \times \text{width (cm)}$$

3) Elongation rate measurement: By an ASTM D638 method, a specimen was drawn in a cross-head speed of 200 mm/min using a test apparatus of U.T.M, and a point where the 1T specimen was cut was measured. The elongation rate was calculated as follows.

$$\text{Elongation rate (\%)} = \text{length after elongation/initial length} \times 100$$

4) Migration loss measurement: According to KSM-3156, a specimen with a thickness of 2 mm or more was obtained, glass plates were attached onto both sides of the specimen, and a load of 1 $kgf/cm^2$ was applied. The specimen was stood in a hot air circulation type oven (80° C.) for 72 hours and then taken out and cooled at room temperature for 4 hours. Then, the weights of the specimen from which glass plates attached onto both sides thereof were removed, were measured before and after standing in the oven, and the migration loss was calculated as follows.

$$\text{Migration loss (\%)} = \{(\text{initial weight of specimen at room temperature} - \text{weight of specimen after standing in oven})/\text{initial weight of specimen at room temperature}\} \times 100$$

The value derived from the equation above was indexed and shown based on the migration loss value of DEHTP of Comparative Example 2, and the lower, the better.

5) Volatile loss measurement: The specimen manufactured was processed at 80° C. for 72 hours, and the weight of the specimen was measured.

$$\text{Volatile loss (wt\%)} = \text{weight of initial specimen} - (\text{weight of specimen after processing at } 80^\circ \text{ C. for 72 hours})/\text{weight of initial specimen} \times 100$$

6) Stress test (stress resistance): A specimen with a thickness of 2 mm in a bent state was stood at 23° C. for 168 hours, and the degree of migration (degree of oozing) was observed. The results were recorded as numerical values, and excellent properties were shown if the quantity was closer to 0.

7) Absorption Rate Measurement

Absorption rate was evaluated by measuring the time consumed for mixing a resin and an ester compound until stabilizing the torque of a mixer by using a planatary mixer (Brabender, P600) in conditions of 77° C. and 60 rpm.

8) Light Resistance Measurement

By a method of ASTM 4329-13, the specimen was put on QUV (QUV/se, Q-LAB) and exposed to UV (340 nm) for a certain time, and color change was calculated using Reflectometer (Tintometer, LoviBond).

(5) Evaluation Results

The evaluation results on the test items are listed in Table 2 and Table 3 below.

TABLE 2

| | Hardness (Shore A) | Hardness (Shore D) | Tensile strength ($kgf/cm^2$) | Elongation rate (%) |
|---|---|---|---|---|
| Example 1 | 88.2 | 42.1 | 220.9 | 334.0 |
| Example 2 | 88.1 | 42.0 | 223.2 | 331.8 |
| Example 3 | 88.1 | 42.0 | 224.6 | 335.4 |
| Example 4 | 88.0 | 42.1 | 225.0 | 332.8 |
| Example 5 | 87.8 | 42.0 | 224.3 | 337.5 |
| Example 6 | 88.2 | 42.2 | 221.3 | 329.8 |
| Example 7 | 88.0 | 42.1 | 225.3 | 335.2 |
| Example 8 | 88.2 | 42.3 | 227.1 | 332.5 |
| Example 9 | 88.0 | 42.0 | 228.4 | 336.1 |
| Example 10 | 88.1 | 42.0 | 227.3 | 332.6 |
| Example 11 | 87.9 | 41.8 | 225.7 | 332.6 |
| Example 12 | 88.0 | 42.2 | 218.9 | 337.8 |
| Comparative Example 1 | 91.3 | 47.1 | 229.0 | 319.0 |
| Comparative Example 2 | 92.4 | 47.9 | 246.3 | 344.4 |
| Comparative Example 3 | 84.6 | 39.0 | 205.5 | 286.4 |
| Comparative Example 4 | 86.6 | 40.7 | 205.1 | 298.1 |
| Comparative Example 5 | 88.0 | 42.1 | 206.0 | 289.7 |
| Comparative Example 6 | 92.3 | 45.1 | 227.3 | 345.6 |
| Comparative Example 7 | 92.5 | 45.4 | 228.2 | 341.2 |
| Comparative Example 8 | 94.1 | 48.7 | 229.5 | 354.1 |
| Comparative Example 9 | 97.2 | 53.4 | 237.4 | 365.0 |

TABLE 3

| | Migration loss (%) | Volatile loss (%) | Stress migration | Absorption rate | Light resistance |
|---|---|---|---|---|---|
| Example 1 | 0.74 | 0.58 | 0 | 5'10" | 0.61 |
| Example 2 | 0.66 | 0.70 | 0 | 5'05" | 0.52 |
| Example 3 | 0.90 | 0.62 | 0 | 5'05" | 0.62 |
| Example 4 | 0.85 | 0.66 | 0 | 5'10" | 0.55 |
| Example 5 | 0.74 | 0.65 | 0 | 5'00" | 0.60 |
| Example 6 | 0.87 | 0.65 | 0 | 5'15" | 0.74 |
| Example 7 | 0.84 | 0.68 | 0 | 5'15" | 0.80 |
| Example 8 | 0.90 | 0.70 | 0 | 5'20" | 0.92 |
| Example 9 | 0.74 | 0.58 | 0 | 4'55" | 0.68 |
| Example 10 | 0.80 | 0.61 | 0 | 5'00" | 0.74 |
| Example 11 | 0.68 | 0.72 | 0 | 4'50" | 0.88 |
| Example 12 | 0.95 | 0.69 | 0 | 5'12" | 0.80 |
| Comparative Example 1 | 2.44 | 0.72 | 0.5 | 5'55" | 1.01 |
| Comparative Example 2 | 5.64 | 0.79 | 3.0 | 6'58" | 2.84 |
| Comparative Example 3 | 0.45 | 4.51 | 0 | 2'30" | 0.86 |
| Comparative Example 4 | 0.84 | 2.03 | 0 | 3'54" | 0.77 |
| Comparative Example 5 | 1.20 | 2.65 | 0 | 5'28" | 0.99 |
| Comparative Example 6 | 2.30 | 0.57 | 1.5 | 6'56" | 0.98 |
| Comparative Example 7 | 2.54 | 0.75 | 2.0 | 8'20" | 1.02 |
| Comparative Example 8 | 2.89 | 0.54 | 2.5 | 8'16" | 1.00 |
| Comparative Example 9 | 3.45 | 0.56 | 3.0 | 9'45" | 1.11 |

Referring to the results of Table 2 and 3, it could be confirmed that cases where the plasticizers of Examples 1 to 12 were applied, mostly showed better physical properties and excellent balance between physical properties, particularly, excellent effects of tensile strength, volatile loss, migration loss and light resistance than cases where the plasticizers of Comparative Examples 1 to 9 were applied. Further, the absorption rate was not too fast within about 5 minutes, and there were no worries on discharge. With regard to the absorption rate of not exceeding 7 minutes, it could be confirmed that processability was also excellent.

Particularly, in contrast to Comparative Examples 1 and 2 in which commercial products of the conventional plasticizer were applied, great improvement was confirmed in view of migration loss and volatile loss, absorption rate was also improved, and the improvement of processability could be also expected. Particularly, in contrast to Comparative Example 2 which is the conventional eco-friendly product, it could be confirmed that stress resistance and light resistance were also very excellent.

In addition, in case of applying an alcohol having a carbon number of 4 as in Comparative Example 3, the absorption rate was 2 minutes and very fast, but the plasticizer was absorbed during mixing in a short time, and then the phenomenon of discharging again was observed, and thus, very inferior processability could be expected.

Mechanical properties and volatile loss were confirmed to levels not satisfying the consumer's basic requirement conditions. In Comparative Examples 4 and 5, an alcohol with a carbon number of 5 was applied, and like the case of carbon number of 4, it was confirmed that tensile strength and elongation rate as mechanical properties were very poor, and volatile loss was also significantly poor.

Also, in Comparative Examples 6 and 7 in which a carbon number of 7 was applied, it was confirmed that the plasticization efficiency was extremely poor, migration was inferior, stress resistance was inferior, and at the same time absorption rate was markedly slow. These phenomena were confirmed further inferior in Comparative Example 8 in which a carbon number of 8 was applied and Comparative Example 9 in which a carbon number of 9 was applied.

Through this, it could be found that if the plasticizers of the Examples are applied, the balance of all physical properties is appropriate, and a plasticizer can be provided to a level meeting product satisfaction standard without degrading any one of the physical properties.

However, in case of applying a plasticizer not included in the present invention, though some physical properties could be evaluated excellent, two or more extremely poor physical properties are present, thereby failing to meet the product satisfaction standard.

The invention claimed is:

1. A citrate-based plasticizer composition comprising a citrate-based composition comprising one or more citrates of the following Formula 1:

[Formula 1]

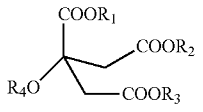

wherein in Formula 1, $R_1$ to $R_3$ are each independently an n-hexyl group, a branched hexyl group or a cyclopentylmethyl group, and $R_4$ is hydrogen or an acetyl group, wherein an alkyl group of the citrate is derived from an isomer mixture of hexyl alcohol having a degree of branching of 0.1 to 1.5, wherein the isomer mixture of hexyl alcohol comprises 1-hexanol, 2-methylpentanol and 3-methylpentanol, wherein the isomer mixture of hexyl alcohol comprises 40 parts by weight or less of 1-hexanol with respect to 100 parts by weight of the isomer mixture, and wherein the isomer mixture of hexyl alcohol comprises 40 parts by weight or more of a branched alcohol with respect to 100 parts by weight of the isomer mixture.

2. The plasticizer composition of claim 1, wherein the isomer mixture of hexyl alcohol comprises 50 to 95 parts by weight of a branched alcohol with respect to 100 parts by weight of the isomer mixture.

3. The plasticizer composition of claim 1, wherein the isomer mixture of hexyl alcohol comprises 1-hexanol, 2-methylpentanol, 3-methylpentanol and cyclopentylmethanol.

4. The plasticizer composition of claim 3, wherein the isomer mixture of hexyl alcohol comprises 20 parts by weight or less of cyclopentylmethanol with respect to 100 parts by weight of the isomer mixture.

5. A resin composition, comprising:

100 parts by weight of a resin; and 5 to 150 parts by weight of the plasticizer composition of claim 1.

6. The resin composition of claim 5, wherein the resin is one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, natural rubber and synthetic rubber.

* * * * *